United States Patent
Griffin

(10) Patent No.: US 7,322,208 B1
(45) Date of Patent: Jan. 29, 2008

(54) UMBRELLA AND COOLING APPARATUS COMBINATION

(76) Inventor: Alfred Griffin, 5936 Romaine Pl., Saint Louis, MO (US) 63112

(*) Notice: Subject to any disclaimer, the term of this patent is extended or adjusted under 35 U.S.C. 154(b) by 310 days.

(21) Appl. No.: 11/246,834

(22) Filed: Oct. 11, 2005

(51) Int. Cl.
*F25D 3/02* (2006.01)
(52) U.S. Cl. .......................................... 62/420; 135/16
(58) Field of Classification Search .............. 62/420, 62/425; 135/16, 98, 910
See application file for complete search history.

(56) References Cited

U.S. PATENT DOCUMENTS

| | | | |
|---|---|---|---|
| 1,148,332 A | 7/1915 | Onyskow | |
| 3,177,881 A | 4/1965 | Covington | |
| 5,172,711 A | 12/1992 | Mueller et al. | |
| 5,207,238 A * | 5/1993 | Rivera et al. | 135/16 |
| 5,273,062 A | 12/1993 | Mozdzanowski | |
| D409,369 S | 5/1999 | Vega | |
| 5,979,793 A * | 11/1999 | Louis | 239/128 |
| 6,230,723 B1 | 5/2001 | Hixson | |
| 6,298,866 B1 | 10/2001 | Molnar, IV | |
| 6,325,084 B1 | 12/2001 | Cohen | |

* cited by examiner

Primary Examiner—Melvin Jones

(57) ABSTRACT

An umbrella and cooling apparatus combination includes a housing having a top wall, a bottom wall and a peripheral wall. The top wall has a plurality of air inlets extending therethrough. A fastener attached to the top wall is removably attachable to a bottom side of a canopy. An elongated handle has a top end attached to the bottom wall. A screen is mounted in the housing and divides the housing into an upper compartment and a lower compartment. At least one duct is fluidly coupled to the lower compartment and has a free end extending outwardly from the housing. A fan assembly is mounted in the housing and is configured for directing air outwardly of the ducts when the fan assembly is turned on. Ice is positionable in the upper compartment and air moved through the ice and outwardly of the ducts so that the ice cools the air.

4 Claims, 4 Drawing Sheets

UMBRELLA AND COOLING APPARATUS COMBINATION

BACKGROUND OF THE INVENTION

1. Field of the Invention

The present invention relates to cooling devices and more particularly pertains to a new cooling device for cooling a person while they use an umbrella.

2. Description of the Prior Art

The use of cooling devices is known in the prior art. U.S. Pat. No. 5,172,711 describes an umbrella that includes a fan attached thereto for blowing air on a person using the umbrella. Another type of cooling device is U.S. Pat. No. 6,298,866 having a table umbrella and fan combination which also includes a misting system for cooling a user of the table umbrella. Another such device is found in U.S. Pat. No. 1,148,332 and includes an umbrella and fan combination assembly. Still yet another such device is found in U.S. Pat. No. 6,325,084.

While these devices fulfill their respective, particular objectives and requirements, the need remains for a device that includes an umbrella and fan system for cooling a person using the umbrella. Further, the device should be configured to allow a person to have cooled air blown on them to further increase the cooling affects of the device.

SUMMARY OF THE INVENTION

The present invention meets the needs presented above by generally comprising a housing that has a top wall, a bottom wall and a peripheral wall that is attached to and extends between the top and bottom walls. The top wall has a plurality of air inlets extending therethrough. A fastener attached to the top wall is removably attachable to a bottom side of a canopy so that the canopy covers the housing. An elongated handle has a bottom end and a top end. The top end is removably attached to the bottom wall of the housing. A screen is mounted in the housing and is positioned between the top and bottom walls and divides the housing into an upper compartment and a lower compartment. At least one duct is fluidly coupled to the lower compartment and has a free end extending outwardly from the housing. A fan assembly is mounted in the housing and is configured for directing air outwardly of the ducts when the fan assembly is turned on. Ice is positionable in the upper compartment and air moved through the ice and outwardly of the ducts so that the ice cools the air.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
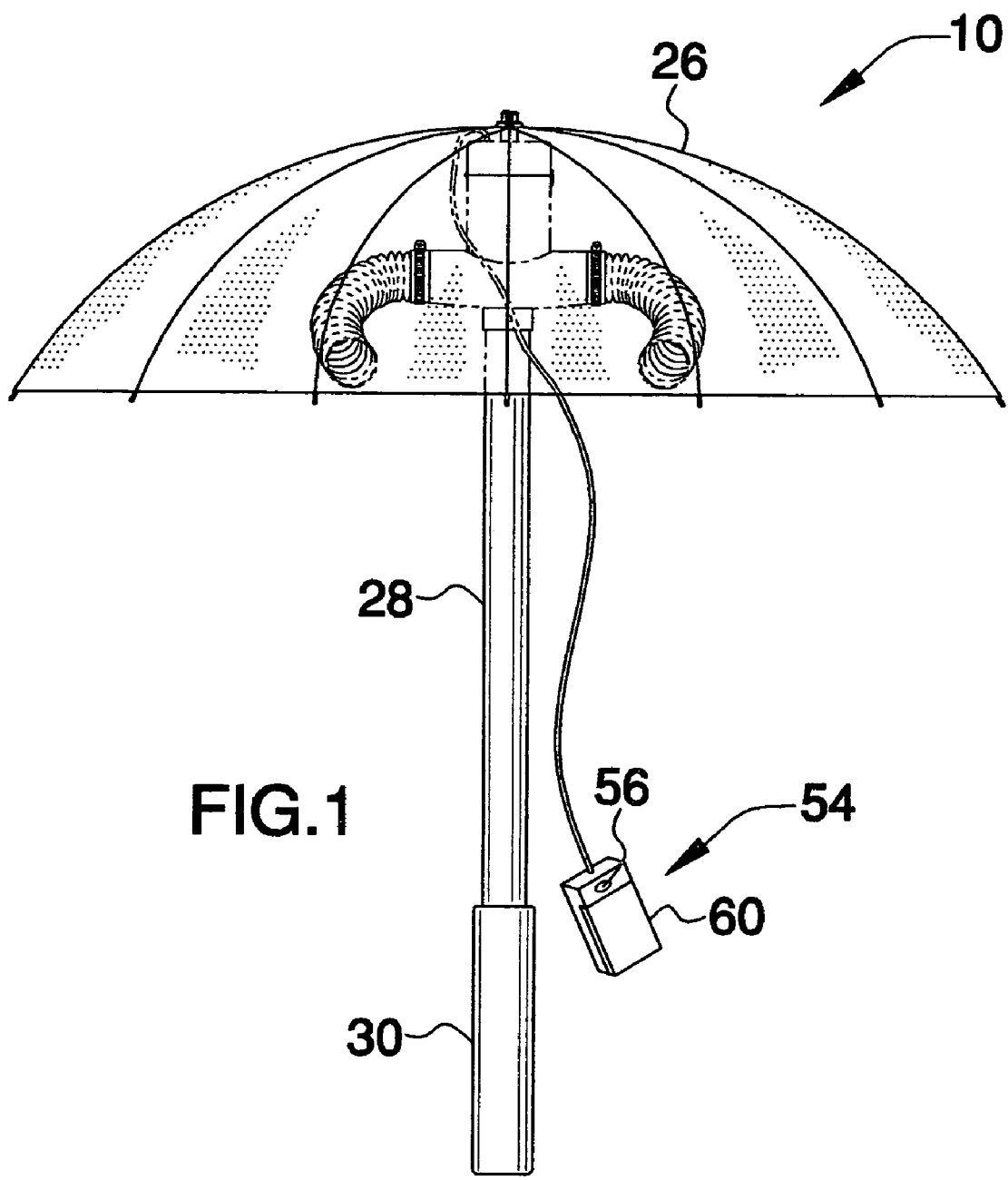
FIG. 1 is a front view of an umbrella and cooling apparatus combination according to the present invention.
Figure 2:
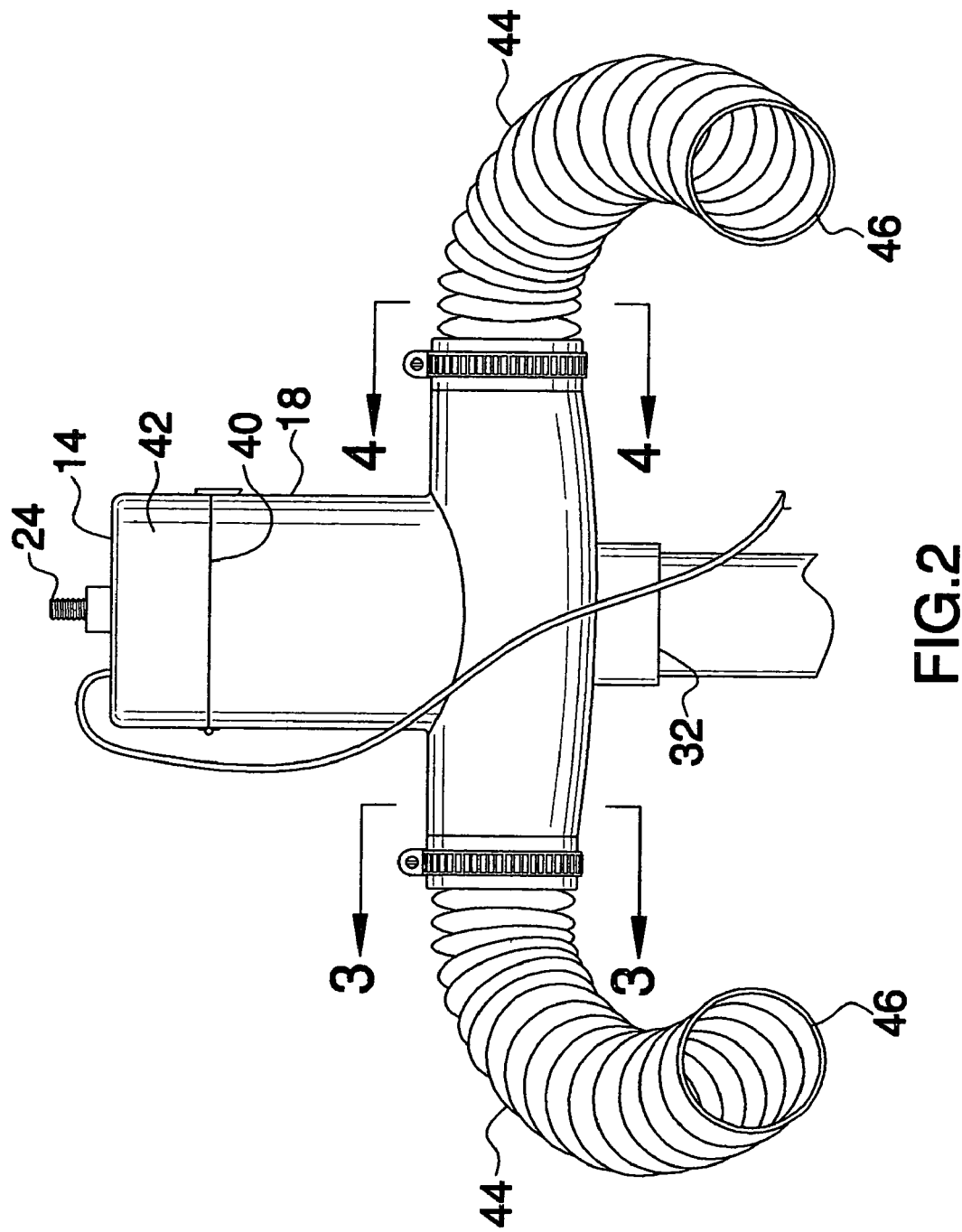
FIG. 2 is a front view of a cooling system of the present invention.
Figure 3:
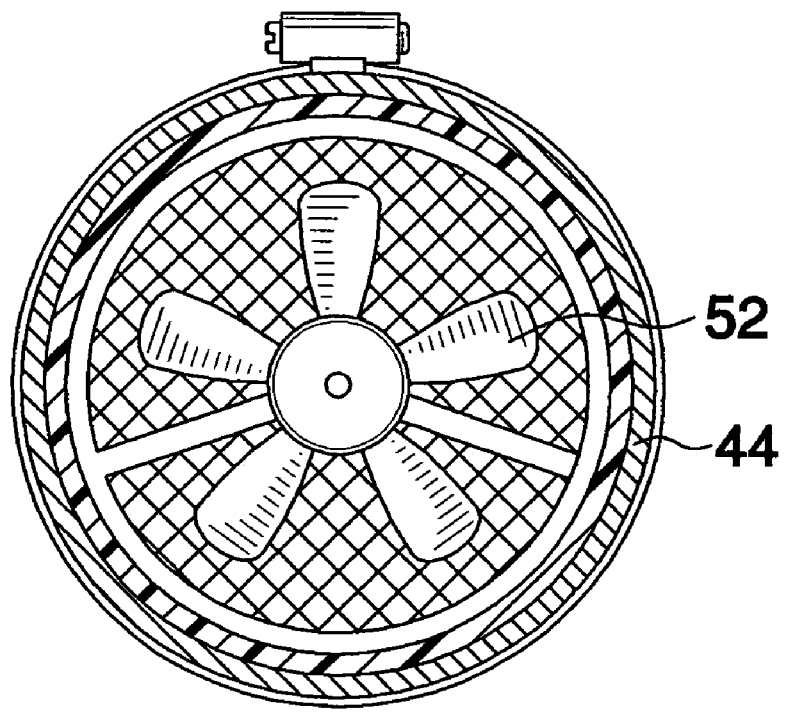
FIG. 3 is a cross-sectional view taken along line 3-3 of FIG. 2 of the present invention.
Figure 4:
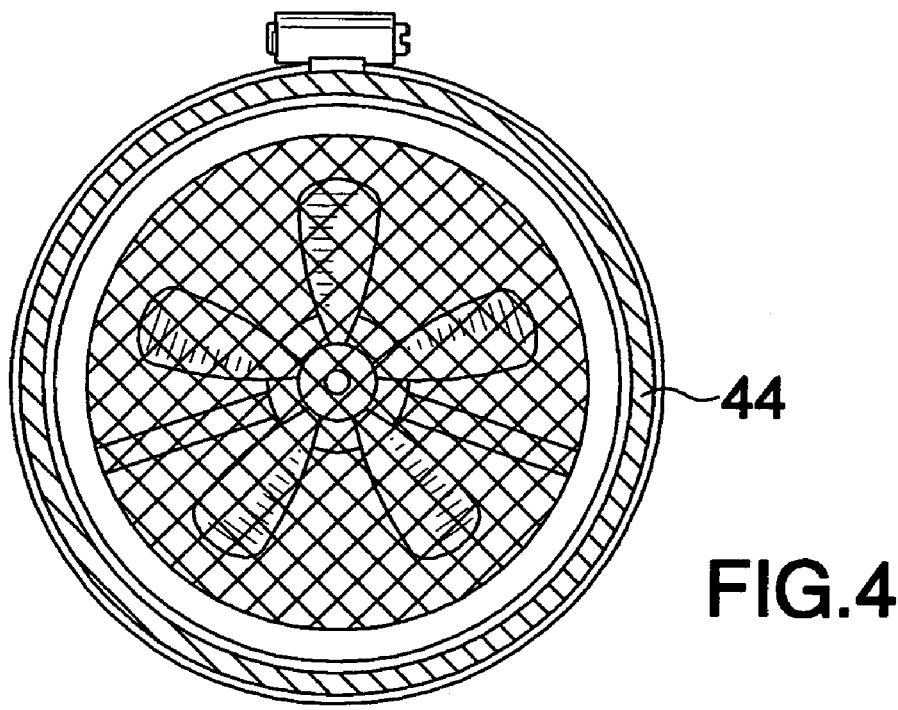
FIG. 4 is a cross-sectional view taken along line 4-4 of FIG. 2 of the present invention.
Figure 5:
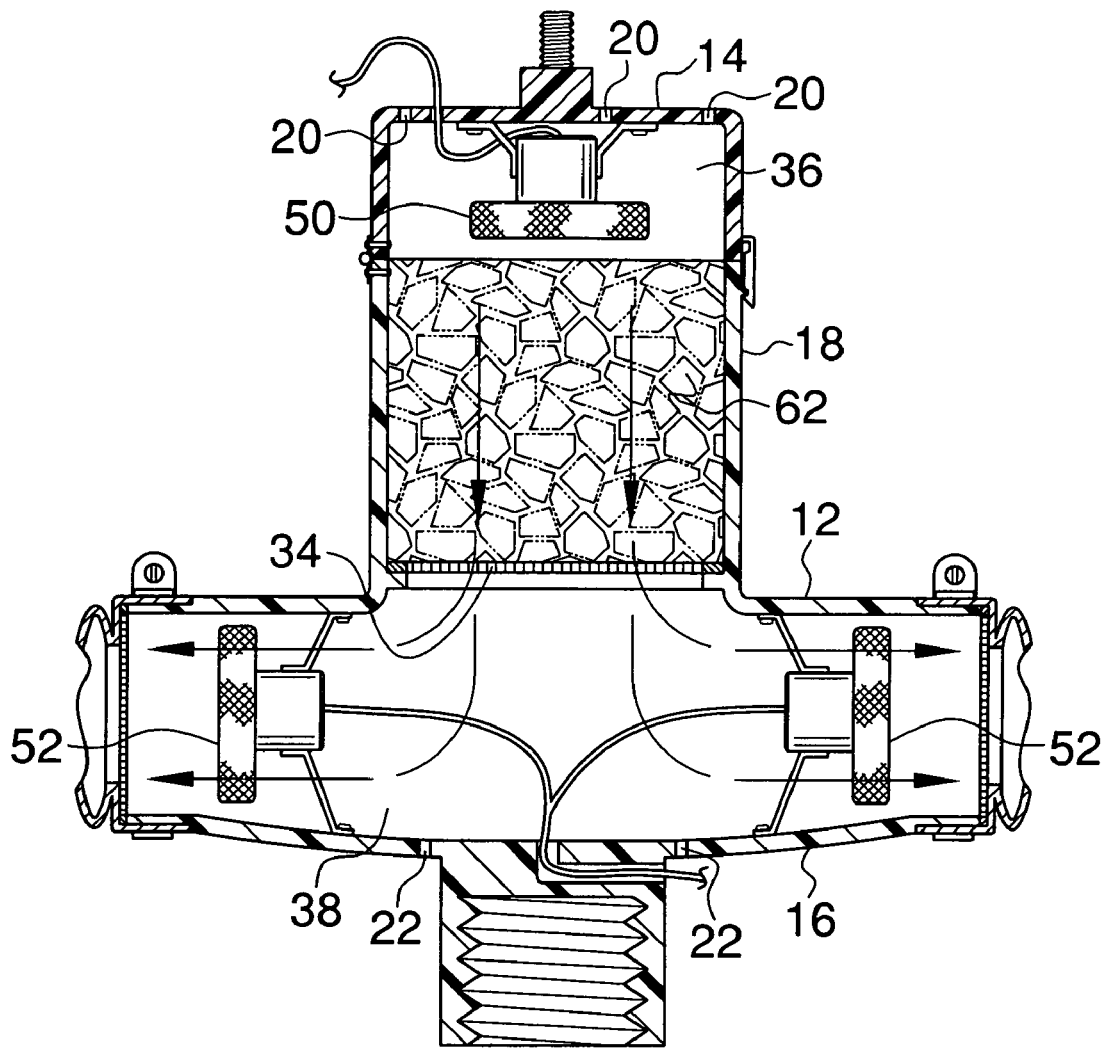
FIG. 5 is a cross-sectional view of a housing of the present invention.
Figure 6:
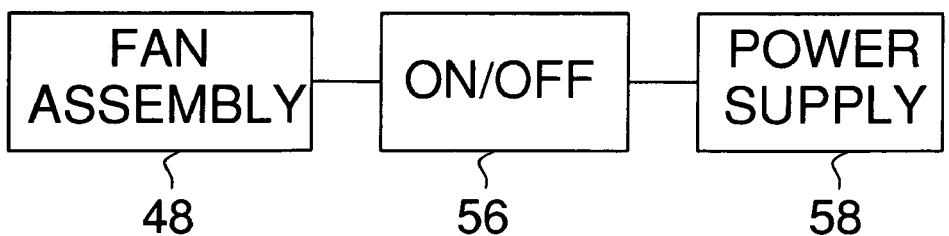
FIG. 6 is an electronic schematic view of the present invention.

With reference now to the drawings, and in particular to FIGS. 1 through 6 thereof, a new cooling device embodying the principles and concepts of the present invention and generally designated by the reference numeral 10 will be described.

As best illustrated in FIGS. 1 through 6, the umbrella and cooling apparatus combination 10 generally comprises a housing 12 that has a top wall 14, a bottom wall 16 and a peripheral wall 18 that is attached to and extends between the top 14 and bottom 16 walls. The top wall 14 has a plurality of air inlets 20 extending therethrough. The bottom wall 16 has a plurality of drain apertures 22 extending therethrough. A fastener 24 is attached to and extends upwardly from the top wall 14. The fastener 24 is removably attachable to a bottom side of a canopy 26 so that the canopy 26 covers the housing 12. An elongated handle 28 has a bottom end 30 and a top end 32. The top end 32 is removably attached to the bottom wall 16 of the housing 12. The top end 32 may include drainage conduits extending therein and outwardly of the bottom end 30 which may be aligned with the drain apertures 22.

A screen 34 is mounted in the housing 12 and is positioned between the top 14 and bottom 16 walls. The screen 34 divides the housing 12 into an upper compartment 36 and a lower compartment 38. The perimeter wall 18 has a break 40 therein positioned adjacent to the top wall 14. A cover 42 is defined between the break 40 and the top wall 14. The cover 42 is selectively positioned in an open position or in a closed position.

A pair of ducts 44 is fluidly coupled to the lower compartment 38. The ducts 44 each have a free end 46 extending outwardly from the housing 12. The ducts 44 extend outwardly from the housing 12 in generally opposite directions with respect to each other. Each of the ducts 44 is selectively bendable.

A fan assembly 48 is mounted in the housing 12 and is configured for directing air outwardly of the ducts 44 when the fan assembly 48 is turned on. The fan assembly 48 includes at least one fan 50 positioned adjacent to the top wall 14. The fan assembly 48 may include a pair of secondary fans 52. Each of the secondary fans 52 is positioned adjacent to one of the ducts 44. A control 54 is operationally coupled to the fan assembly 48 and is configured to selectively turn the fan assembly 48 on or off. The control 54 includes an actuator 56 configured to selectively open or close a connection between a power supply 58 and the fan assembly 48. The power supply 58 preferably includes one or more batteries removably mounted in a control housing 60.

In use, ice 62 may be positioned in the upper compartment 36 and air moved through the ice 62 and outwardly of the ducts 44 so that the air is cooled by the ice 62. The air, now cooled, is directed toward a person holding the handle 28 to cool the person while they use the umbrella. The canopy 26 may be used for shading a person from sunlight or rainfall.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An umbrella and cooling system combination comprising:
   a housing having a top wall, a bottom wall and a peripheral wall being attached to and extending between said top and bottom walls, said top wall having a plurality of air inlets extending therethrough, a fastener being attached to and extending upwardly from said top wall, said fastener being removably attachable to a bottom side of a canopy such that said housing is covered by said canopy, an elongated handle having a bottom end and a top end, said top end being removably attached to said bottom wall of said housing;
   a screen being mounted in said housing and being positioned between said top and bottom walls, said screen dividing said housing into an upper compartment and a lower compartment;
   at least one duct being fluidly coupled to said lower compartment, said at least one duct having a free end extending outwardly from said housing;
   a fan assembly being mounted in said housing and being configured for directing air outwardly of said ducts when said fan assembly is turned on; and
   wherein ice may be positioned in said upper compartment and air moved through said ice and outwardly of said ducts such that the air is cooled by the ice.

2. The combination according to claim 1, wherein said perimeter wall has a break therein positioned adjacent to said top wall, a cover being defined between said break and said top wall, said cover being selectively positioned in an open position or in a closed position.

3. The combination according to claim 1, wherein said at least one duct is selectively bendable.

4. An umbrella and cooling system combination comprising:
   a housing having a top wall, a bottom wall and a peripheral wall being attached to and extending between said top and bottom walls, said top wall having a plurality of air inlets extending therethrough, said bottom wall having a plurality of drain apertures extending therethrough, a fastener being attached to and extending upwardly from said top wall, said fastener being removably attachable to a bottom side of a canopy such that said housing is covered by said canopy, an elongated handle having a bottom end and a top end, said top end being removably attached to said bottom wall of said housing;
   a screen being mounted in said housing and being positioned between said top and bottom walls, said screen dividing said housing into an upper compartment and a lower compartment, said perimeter wall having a break therein positioned adjacent to said top wall, a cover being defined between said break and said top wall, said cover being selectively positioned in an open position or in a closed position;
   a pair of ducts being fluidly coupled to said lower compartment, said ducts each having a free end extending outwardly from said housing, said ducts extending outwardly from said housing in generally opposite directions with respect to each other, each of said ducts being selectively bendable;
   a fan assembly being mounted in said housing and being configured for directing air outwardly of said ducts when said fan assembly is turned on;
   a control being operationally coupled to said fan assembly and being configured to selectively turn said fan assembly on or off; and
   wherein ice may be positioned in said upper compartment and air moved through said ice and outwardly of said ducts such that the air is cooled by the ice.

\* \* \* \* \*